United States Patent [19]
Burns et al.

[11] Patent Number: 5,565,174
[45] Date of Patent: Oct. 15, 1996

[54] APPARATUS FOR CONTROLLING REMOVAL OF POLYMERIZATION REACTION EFFLUENT

[75] Inventors: David H. Burns; William E. Martin, both of Bartlesville, Okla.

[73] Assignee: Phillips Petroleum Company, Bartlesville, Okla.

[21] Appl. No.: 469,977

[22] Filed: Jun. 6, 1995

Related U.S. Application Data

[62] Division of Ser. No. 280,893, Jul. 27, 1994, Pat. No. 5,455,314.
[51] Int. Cl.$^6$ ................................................. C08F 2/14
[52] U.S. Cl. ........................................ 422/131; 422/133
[58] Field of Search ......................... 526/61; 422/131, 422/133

[56] References Cited

U.S. PATENT DOCUMENTS 3,711,457  1/1973  Ayres ............................ 526/61

*Primary Examiner*—Thomas R. Weber
*Attorney, Agent, or Firm*—George E. Bogatie

[57] ABSTRACT

In withdrawing a reaction slurry from a polymerization reactor wherein solid particles in the slurry must be maintained in solution to prevent solidification, a redundant effluent line is provided to remove the slurry in the event the primary line becomes plugged. In use the primary and redundant lines are controlled in different manners such that a v-notch ball valve in the primary line is manipulated continuously to remove effluent while maintaining stable reactor conditions, and a control valve in the redundant line is manipulated intermittently as a backup for the primary control valve.

10 Claims, 1 Drawing Sheet

APPARATUS FOR CONTROLLING REMOVAL OF POLYMERIZATION REACTION EFFLUENT

This application is a division of application Ser. No. 08/280,893, filed Jul. 27, 1994, now U.S. Pat. No. 5,455,314.

This invention relates generally to process controls, and more particularly to a pressure responsive system for controlling removal of reaction product from a polymerization reactor. The invention further relates to a method for removing polymerization reaction effluent.

BACKGROUND OF THE INVENTION

In many polymerization processes for the production of normally solid olefin polymers such as polypropylene, polyethylene and copolymers thereof, a stream is formed which is a slurry of particulate polymer solids suspended in a liquid medium which is usually the reaction diluent. Typically these polymerization processes employ a relatively high pressure continuous reactor, such as a loop reactor, which is operated at a pressure in a range of about 600 to 650 psig and may have a downwardly depending settling leg to facilitate product removal. In such processes a slurry of produced solid polymer and diluent is discharged into a separation chamber where e.g., the slurry is flashed to a low pressure such as about 20 psia. Further information and details of the polymerization process, including examples of suitable reaction conditions as well as control schemes for other important variables, such as solids concentration, production rate, etc., can be found in U.S. Pat. No. 3,998,995 of Buss et al and U.S. Pat. No. 3,257,363 of Miller et al, the disclosures of which are incorporated herein by reference.

A problem encountered in controlling removal of polymerization effluent from a loop reactor is that the solids must be maintained suspended in a diluent to prevent solidification. Otherwise the control valve in the effluent line becomes plugged with solid polymer. Since the primary valve controlling effluent removal may become plugged with solid polymer and be inoperative, a removal system that includes a backup or secondary removal line that automatically operates when the primary line is unavailable is highly desirable.

Accordingly, it is an object of this invention to withdraw reaction effluent from a polymerization reactor in a safe and efficient manner.

Another object of this invention is to operate a primary reaction effluent line in a manner that maintains stable reactor conditions.

A further objective is to operate a backup reaction effluent line in a manner that minimizes the likelihood of complete plugging of the removal system with solid polymer.

SUMMARY OF THE INVENTION

According to the present invention, the foregoing and other objects and advantages are attained by providing a redundant or secondary effluent removal line that automatically operates to withdraw reaction effluent if the primary effluent removal line is unavailable. In this invention reaction slurry flowing in the primary effluent line is continuously controlled using a v-notch ball valve to manipulate slurry flow.

In preferred embodiment the primary effluent line is controlled responsive to a first set point representative of a desired reactor pressure and utilizes the v-notch ball valve to continuously vary or "throttle" slurry flow, while the secondary line is controlled in a different manner, i.e., the secondary line is controlled responsive to a second set point representative of a desired reactor pressure which is greater than the first set point, and utilizes a secondary valve operated intermittently, such as a two position "open-closed" valve manipulated in a cyclic manner to adjust effluent flow.

Further in accordance with this invention the continuous primary control valve for the primary effluent removal line is manipulated by a conventional proportional-integral-derivative (PID) controller, while the secondary valve is normally closed. In the event reactor pressure rises above a designated level, which will occur if the primary valve becomes plugged with polymer, the secondary valve automatically operates responsive to an on-off controller, such that the secondary valve is fully open for a period of time and then closed for a period of time, wherein the combined open and closed time for one cycle is a convenient time period, such as twelve seconds. Accordingly, a particular form of proportional control is achieved by the on-off controller in that the secondary valve opens for a period of time within the cycle period which is proportional to the reactor pressure deviation from the second set point.

Other objects and advantages of the invention will be apparent from the foregoing brief description of the invention and the appended claims as well as the detailed description of the invention and the drawings which are briefly described as follows:

DETAILED DESCRIPTION OF THE PREFERRED EMBODIMENT

Figure 1:
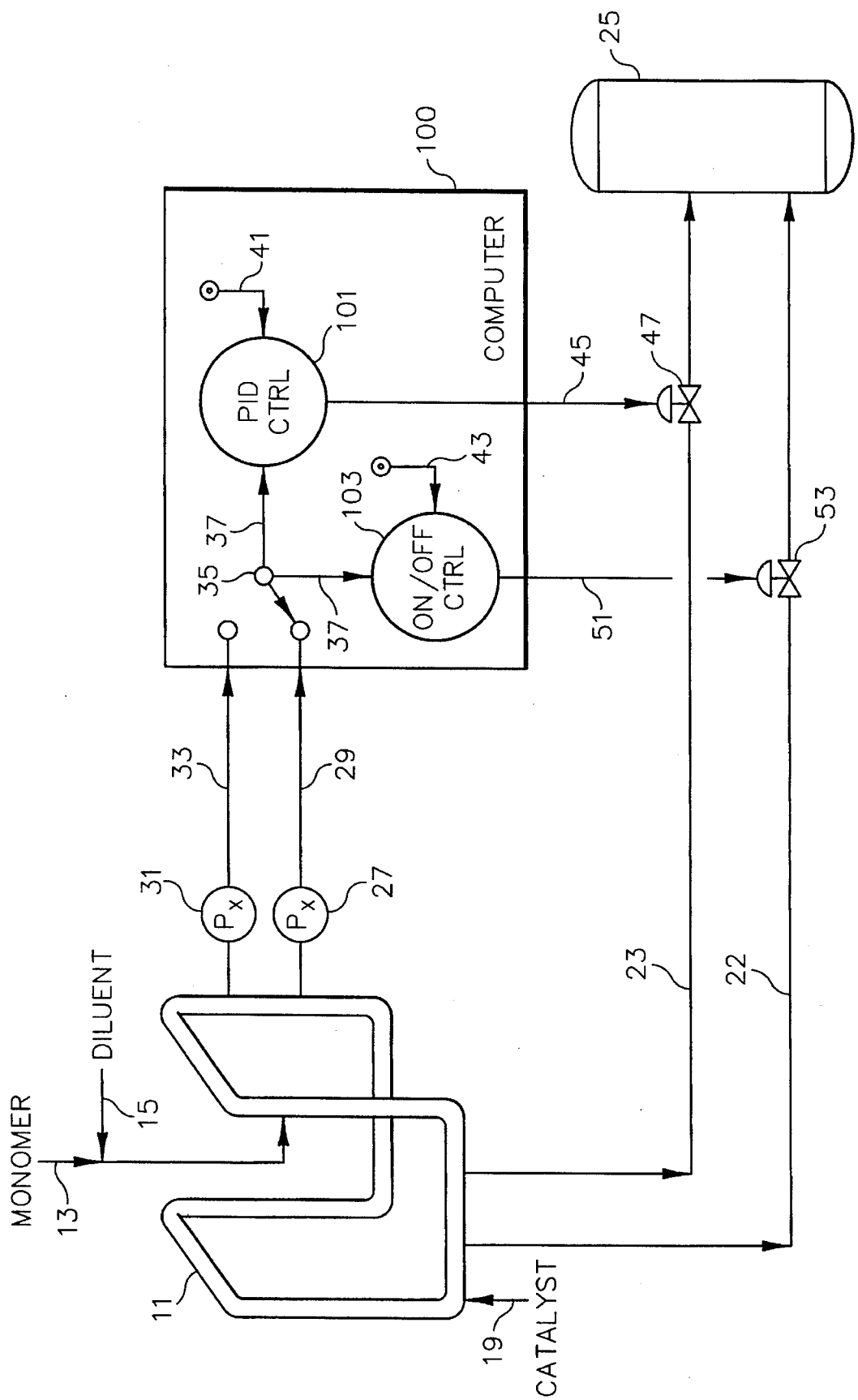
FIG. 1 is a simplified schematic illustration of a polymerization reaction process and the associated control system of the present invention.

This invention is described in the terms of the polymerization of ethylene. The invention is applicable, however, to any process where it is desired to safely withdraw a slurry from a reactor. It is particularly applicable to the operation of loop reactors which produce polyethylene or polypropylene where withdrawal of reaction slurry is continuously controlled by manipulating a v-notch ball valve. As used herein a v-notch ball valve is a valve in which the "ball" has been modified so that only a portion of the ball is used. The edge of the partial ball is characterized by having a v-notch to obtain desired valve characteristics as well as to provide shearing actions at the sharp edges of the valve as it closes. V-notch valves are well known commercial items which are available from Fisher Controls in Marshalltown Iowa.

A specific control system is set forth in FIG. 1 for the sake of illustration. However, the specific control configuration is not a critical feature of the present invention, and the invention is applicable to a large variety of control configurations which may be utilized to accomplish the purpose of this invention. Lines designated as signal lines in the drawings may be electrical or pneumatic in this preferred embodiment. Generally, the signal provided from any transducer is electrical in form, however, the signal provided from some sensors may be pneumatic in form. Transducing of these signals is not illustrated for the sake of simplicity because it is well known in the art that a measurement in pneumatic form must be transduced to electrical form if it is to be transmitted in electrical form. Also, transducing of these signals from analog to digital form or from digital form to analog form is not illustrated because such transducing is also well known in the art.

The invention is also applicable to mechanical, hydraulic or other means for transmitting information. In almost all control systems some combination of electrical, pneumatic, or hydraulic signals will be used. However, use of any other type of signal transmission, compatible with the process and equipment in use, is within the scope of the invention.

A digital computer having backup accommodations is used in the preferred embodiment of this invention to calculate the required control signals based on measured process pressure as well as set points supplied to the computer. Any digital computer having software that allows operation in a real time environment for reading values of external variables and transmitting signals to externals devices is suitable for use in this invention.

Signal lines are also used to represent the results of computer calculations or other operations accomplished in a digital computer. The term "signal" is utilized to refer to such results. Thus, the term signal is used not only to refer to electrical currents or pneumatic pressures but is also used to refer to binary representations of a calculated or measured value.

The PID controller shown in FIG. 1 can utilize the various modes of control such as proportional, proportional-integral, proportional-derivative or proportional-integral-derivative. In the preferred embodiment a proportional-integral mode is utilized. However, any controller having capacity to accept two or more input signals and to produce a scaled output signal, representative of the comparison of the two input signals is within the scope of this invention.

As used herein on-off control is a special type of position control in which the manipulated valve has only one of two possible positions i.e., open or closed. The on-off controller shown in FIG. 1 is a special case of proportional control where the two position control valve is open for a variable period of time which is proportional to the deviation of the reactor pressure from the controller set point.

The scaling of an output signal by a controller is well known in a control systems art. Essentially, the output of a controller can be scaled to represent any desired factor or variable. An example of this is where a desired temperature and an actual temperature are compared by controller. A controller output might be a signal representative of a flow rate of some gas necessary to make the desired and actual temperatures equal. On the other hand, the same output signal could be scaled to represent a pressure required to make the desired and actual temperatures equal. If the controller output can range from 0 to 10 units, then the controller output signal could be scaled so that an output signal having a level of 5 units corresponds to 50 percent, or some specified flow rate, or some specified temperature.

The transducing means used to measure parameters which characterize a process and the various signals generated thereby may take a variety of forms or formats. For example, the control elements of this system can be implemented using electrical analog, digitally electronic, pneumatic, hydraulic, mechanical or other similar types of equipment or combinations of such equipment types.

Referring now to FIG. 1, there is illustrated a polymerization reactor 11. This reactor is a loop type reactor which provides a continuous path of circulation of the reaction mixture.

Ethylene is supplied to the reactor 11 through conduit 13. In like manner a diluent, such as isobutane, pentane, isopentane or mixtures thereof is provided to the reactor 11 through conduit 15. A catalyst, such as typical chromium oxide on silica catalyst or a silica-titanium catalyst is provided to reactor 11 through conduit 19. The reaction effluent is normally withdrawn from reactor 11 through a primary reaction effluent conduit 23 and passed to a separation vessel 25. The reaction effluent is a slurry made up of polyethylene, unreacted ethylene and e.g., isobutane. The catalyst is generally contained in the polyethylene. A redundant or so called secondary reaction effluent conduit is illustrated at 22.

Pressure transducer 27 which is operably installed in the reactor 11, provides an output signal 29 which is representative of the actual, pressure in reactor 11. Signal 29 is provided from transducer 27 as an input to computer 100. In a similar manner a backup or redundant transducer 31, which is also installed in reactor 11, provides an output signal 33 which is representative of the actual pressure in reactor 11. Signal 33 is provided from pressure transducer 31 as an input to computer 100. In computer 100 a switch 35, positioned as illustrated in FIG. 1, normally selects signal 29 as process variable input signal 37 which is provided to PID controller 101 and the on-off controller 103. In the, event that signal 29 from pressure transducer 27 fails, switch 35 is automatically positioned to select signal 33 from backup transducer 31 as an input signal to controllers 101 and 103.

As indicated above, controllers 101 and 103 are supplied with the same process variable input signal 37. These controllers 101 and 103, however, are provided with individual operator supplied set point signals as illustrated at 41 and 43 respectively. The PID controller 101 compares signal 37 and 41 and establishes an output signal 45 which is representative of the difference between signals 37 and 41. Signal 45 which is provided to a v-notch ball valve 47 operably located in conduit 23 is scaled to be representative of the position of control valve 47 required to maintain process variable signal 37 substantially equal to set point signal 41, and valve 47 is manipulated responsive to control signal 45. The on-off controller 103 compares signals 37 and 43 and establishes an output signal 51 which is representative of the difference between signals 37 and 43. Signal 51, which is provided to control valve 53 operably located in effluent line 22, is scaled to operate on a 12 second cycle period with the valve 53 held open for a portion of the 12 second cycle period required to maintain process variable signal 37 substantially equal to set point signal 43. Accordingly, valve 53 is manipulated responsive to control signal 51.

For reasons of brevity and clarity, conventional auxiliary equipment such as pumps, additional valves such as block-in or emergency shut-down valves, pressure interlocks, etc. which would be required for a commercial operation have not been included in the above description as they play no part in the explanation of the invention.

In practice of the invention withdrawal of reaction effluent through the continuously manipulated primary effluent valve is preferred. This is because the continuous removal of reaction effluent stabilizes reactor pressure and consequently stabilizes feed flow and other reactor conditions. For example with continuous effluent removal reactor pressure can be maintained within a range of about ±2 to 3 psig, compared to about ±7 to 10 psig with intermittent control. To insure that the primary controller normally manipulates product flow, its set point, which is representative of reactor pressure, is maintained at a value below the set point of secondary controller e.g., about 5 to 10 psig below. If the continuous valve plugs with solid polymer the reactor pressure increases and the backup valve, automatically opens and is manipulated to control reactor pressure, thus avoiding an interruption of production until the operation of the primary continuous valve is restored.

The invention has been described in terms of a preferred embodiment as illustrated in FIG. 1. The specific components used in the practice of the invention as illustrated in FIG. 1, such as computer process control, automatic controllers, final control elements, process measurements, are each described at length in Perry's Chemical Engineering Handbook, 6th Edition, Chapter 22, McGraw-Hill.

While the invention has been described in terms of the presently preferred embodiment reasonable variations and modifications, such as contouring the edge of the partial ball in the continuous control valve in the shape of a U or a parabola, are possible by those skilled in the art and such variations and modifications are within the scope of the described invention and the appended claims.

That which is claimed:

1. Apparatus comprising:

a polymerization reactor containing a reaction means for slurry comprising solid polymer particles and a diluent;

a separation vessel means for receiving said reaction slurry and flashing said slurry to provide a solid polymer product;

an unshared primary conduit means for passing said reaction slurry from said reactor to said separation vessel, said primary conduit means having a primary control valve operatively located therein;

a secondary conduit means, independent of said primary conduit means for passing said reaction slurry from said reactor to said separation vessel when said primary conduit is inoperative, said secondary conduit means having a secondary control valve operatively located therein;

means for controlling the pressure in said polymerization reactor at a first desired pressure by automatically manipulating said primary control valve in a continuous manner;

means for controlling the pressure in said polymerization reactor at a second desired pressure when said primary conduit is inoperative by automatically manipulating said secondary control valve in an on-off manner; and means for automatically initiating withdrawal of said reaction slurry from said reactor in said secondary conduit when said primary conduit means is inoperative.

2. Apparatus in accordance with claim 1, wherein said means for maintaining the pressure in said reactor at said first desired pressure comprises:

means for establishing a first signal representative of the actual pressure in said reactor;

means for establishing a second signal representative of said first desired pressure for said reactor;

proportional-integral-derivative controller means for comparing said first signal and said second signal and for establishing a third signal; responsive to the difference between said first signal and said second signal, wherein said third signal is scaled to be representative of the position of said primary control valve required to maintain the actual pressure in said reactor represented by said first signal substantially equal to said second signal; and means for manipulating said primary control valve responsive to said third signal.

3. Apparatus in accordance with claim 1, wherein said means for maintaining the pressure in said reactor at said second desired pressure comprises:

means for establishing a first signal representative, of the actual pressure in said reactor;

means for establishing a second signal representative of said second desired pressure for said reactor;

an on-off controller means for comparing said first signal and said second signal and for establishing a third signal responsive to the difference between said first signal and said second signal, wherein said third signal is an on-off signal scaled to be representative of a time period for the open position of said secondary control valve required to maintain the actual pressure in said reactor represented by said first signal substantially equal to said second signal; and means for manipulating said secondary control valve responsive to said third signal.

4. Apparatus in accordance with claim 2, wherein said first signal is established by a first pressure transducer operably installed on said reactor.

5. Apparatus in accordance with claim 4, wherein said first signal is established by a second pressure transducer operably installed on said reactor.

6. Apparatus in accordance with claim 3 wherein said second desired pressure for said reactor is greater than said first desired pressure for said reactor.

7. Apparatus in accordance with claim 3, additionally comprising:

a digital computer programmed to provide said third signal based on a desired cycle period, wherein said cycle period includes a first time portion representative of the open position of said secondary control valve and a second time portion representative of the closed position of said secondary control valve.

8. Apparatus in accordance with claim 1, wherein said polymer product is polyethylene.

9. Apparatus in accordance with claim 1, wherein said polymer product is polypropylene.

10. Apparatus in accordance with claim 1, wherein said primary control valve is a v-notch valve.

* * * * *